Feb. 11, 1969  A. SCHMIER  3,427,128
PROCESS OF PRODUCING RAMSDELLIT, A TYPE OF MANGANESE DIOXIDE
Filed Oct. 23, 1963
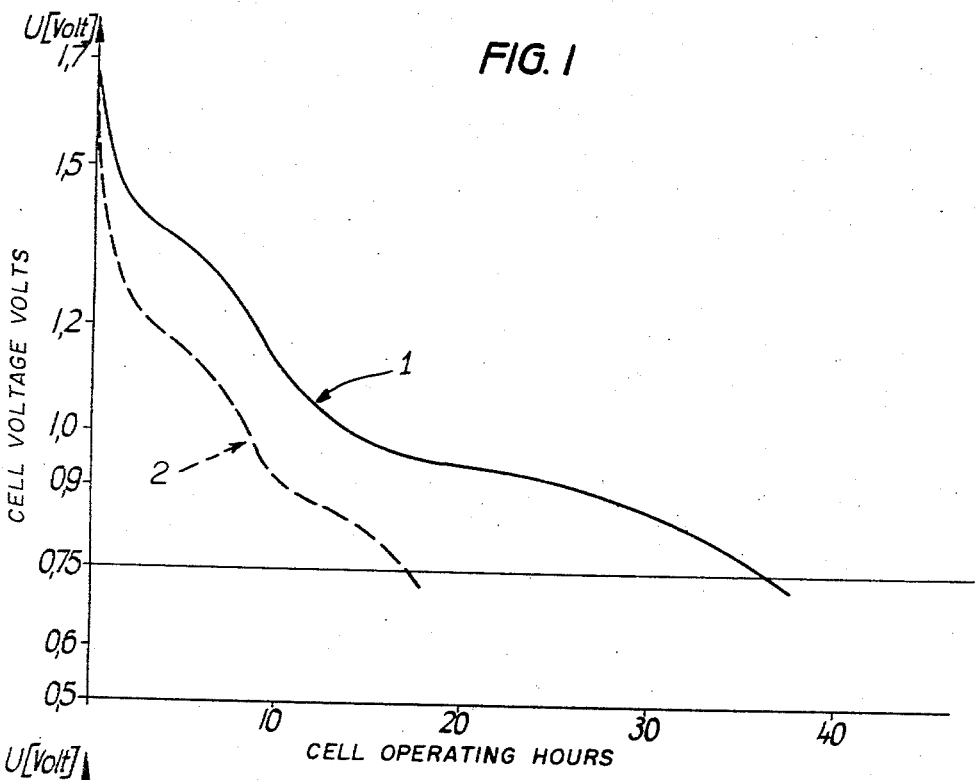
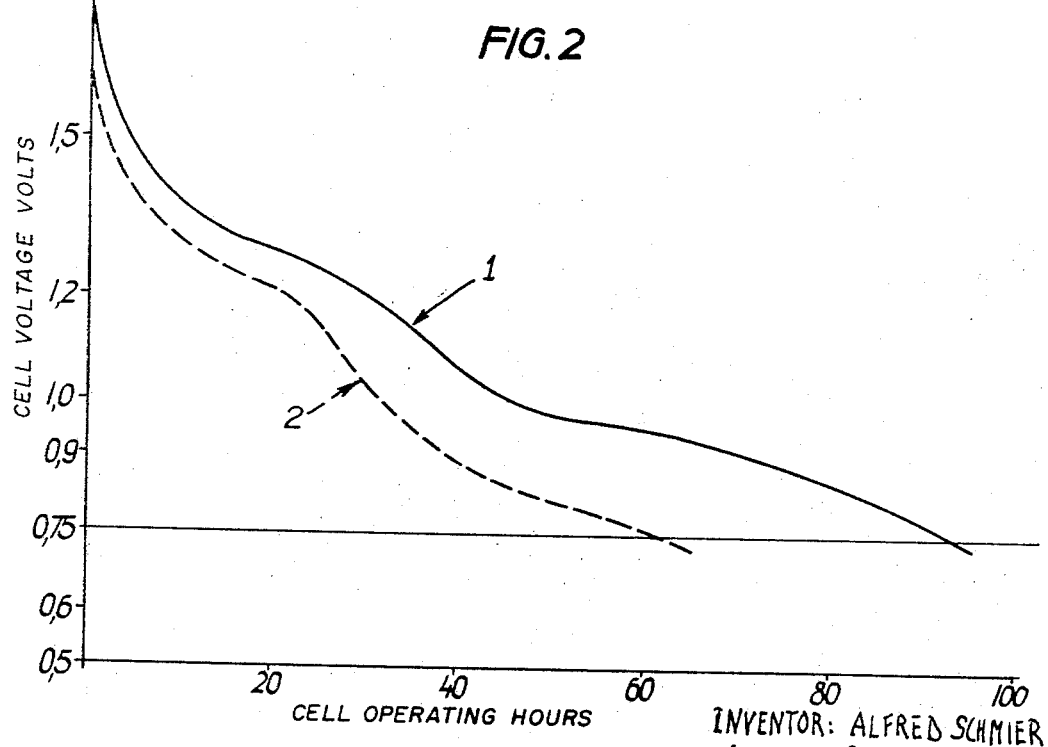
INVENTOR: ALFRED SCHMIER
By Erich M. H. Radde
Agent

United States Patent Office 3,427,128
Patented Feb. 11, 1969

3,427,128
PROCESS OF PRODUCING RAMSDELLIT, A TYPE OF MANGANESE DIOXIDE
Alfred Schmier, Frankfurt am Main, Germany, assignor to Varta Petrix-Union Gesellschaft mit beschränkter Haftung, Ellwangen, Jagst, Germany, a German company
Filed Oct. 23, 1963, Ser. No. 318,238
Claims priority, application Germany, Oct. 27, 1962, P 30,460
U.S. Cl. 23—145     4 Claims
Int. Cl. C01g 45/02, 45/00

ABSTRACT OF THE DISCLOSURE

A process for producing ramsdellit, a type of manganese dioxide, which comprises oxidizing manganese oxide hydrate with a particular aqueous inorganic oxidizing agent. Also a process which relates to producing ramsdellit from gamma-manganese dioxide with a certain aqueous oxidizing acid at elevated temperature. Ramsdellit is a type of manganese dioxide also referred to in the literature as ramsdellite.

---

The present invention relates to an improved process of producing ramsdellit and more particularly to a synthetic process.

Ramsdellit is a modification of manganese dioxide which differs from other manganese dioxide modifications, such as $\alpha$- or $\beta$-manganese dioxide, crystallographically. See George Wood Vinal, "Primary Batteries," John Wiley & Sons, Inc., New York, (1950), pp. 58–71, and Kedesky et al., "Structural Relationship Between Ramsdellite and Some Synthetic Manganese Dioxides," Acta Cryst., (1957), 10, pp. 780–781. For the first time ramsdellit was discovered by Ramsdell in very small amounts at Lake Valley, N.Mex. in 1933. The crystallographic properties of the mineral are known. The mineral is very rare and, heretofore, it was not possible to produce it synthetically.

It is one object of the present invention to provide a simple and effective process of synthetically producing ramsdellit.

Other objects of the present invention and advantageous features thereof will become apparent as the description proceeds.

According to the present invention, ramsdellit is produced synthetically either by oxidizing specific manganese oxides which contain manganese in a proportion smaller than that present in manganese dioxide, or, respectively, by recrystallizing specific manganese dioxides which show only very few lines in their X-ray spectrum.

According to the first mentioned method, ramsdellit is obtained by reducing commercial $\gamma$-manganese dioxide chemically or electrochemically to manganese oxide hydrate. Such a manganese oxide hydrate is described in the literature as groutit and has the formula $\alpha$-MnO(OH). See Collin and Lipscomb, "The Crystal Structure of Groutit, $HMnO_2$," Acta Cryst. (1949), 2, pp. 104–106. This manganese oxide hydrate is similar in its structure to the mineral ramsdellit and differs therefrom solely by forming crystals which are slightly extended in the direction of the a-axis. When carefully oxidizing said $\alpha$-manganese oxide hydrate, a manganese dioxide is obtained which possesses the same crystallographic properties as the natural mineral ramsdellit. Oxidation may be effected by oxidizing agents as they are known in chemistry, more particularly by solutions of perchloric acid and its salts, chromic acid, persulfuric acid, hypochlorites, hypobromites, hypoiodites, and the like. Oxidation is preferably carried out at elevated temperature, but not exceeding 70° C. in order to secure a careful and slow oxidation. The concentration of oxidizing agent must not surpass 30%. Such careful oxidizing is necessary to avoid other oxidized products such as $\beta$-$MnO_2$ beside ramsdellit. Groutit obtained in another way i.e. by oxidizing of pyrochroit $Mn(OH)_2$ or natural groutit may also be used as starting material.

The above process of producing ramsdellit comprises, therefore, oxidizing manganese oxide hydrate of the formula $\alpha$-MnO(OH) with an aqueous inorganic oxidizing agent of the following: perchloric acid and its salts, persulfuric acid and chromic acid of a concentration not exceeding about 30%, at elevated temperature not exceeding about 70° C., for a period of about 100 to about 150 hours, at an oxidation rate controlled to form ramsdellit, and separating the resulting ramsdellit from the oxidizing agent.

The other process of producing ramsdellit according to the invention is based on the fact that manganese dioxides which are difficult to crystallize and the X-ray diagrams of which show only few lines, can be recrystallized to ramsdellit by treating such a manganese dioxide, preferably at elevated temperatures, with acids preferably with oxidizing acids. If, for instance, synthetic manganese dioxides are used as starting materials, the Debye-Scherrer X-ray diagrams of which show only few lines and thus indicates the presence of $\gamma$-manganese dioxide, this process yields manganese dioxides the crystal structures of which correspond exactly to that of ramsdellit as described in the literature.

The table shows the X-ray diagram of the starting material and of the recrystallized product compared with the X-ray diagram of a natural ramsdellit.

| hkl | Starting Material | | Recrystallized Product | | Ramsdellit Mexican Ore | |
|---|---|---|---|---|---|---|
|  | d | J | d | J | d | J |
| 101 | 4.13 | 100 | 4.046 | 100 | 4.046 | 100 |
| 201 |  |  | 3.15 | 26 | 3.203 | 12 |
| 301 |  |  | 2.505 | 42 | 2.543 | 78 |
| 210 | 2.42 | 87 | 2.429 | 90 | 2.463 | 52 |
| 111 |  |  | 2.336 | 65 | 2.336 | 50 |
| 211 | 2.13 | 108 | 2.126 | 100 | 2.134 | 68 |
| 311 |  |  | 1.881 | 30 | 1.900 | 45 |
| 212 | 1.66 | 132 | 1.641 | 100 | 1.656 | 78 |
| 312 |  |  | 1.534 | 21 | 1.536 | 22 |
| 402 |  |  | 1.613 | 65 | 1.618 | 50 |
| 511 |  |  | 1.470 | 21 | 1.472 | 50 |
| 020 | 1.39 | 26 | 1.423 | 48 | 1.434 | 46 |

In the table hkl are Miller indices of the crystal plane, d is the interplanar spacing, and J is intensity of lines relative to the strongest line as 100. See Klug and Alexander, "X-Ray Diffraction Procedures," John Wiley & Sons, Inc., New York, pp. 15–18 and 391–393.

Rasdellit produced by the described processes can be applied most successfully as depolariser in galvanic cells. As shown in the FIGURES 1 and 2, it has been proved that the efficiency of ramsdellit surpasses the efficiency of the $\gamma$-manganese dioxide, the best known manganese dioxide depolariser.

The discharging characteristics 1 refer to a cell with ramsdellit, the discharging characteristics 2 to a cell with highly effective $\gamma$-manganese dioxide as depolariser.

At higher discharging rates at a continuous resistance of 100 ohms (FIG. 1) the number of operating hours until voltage drops to 0.75 volts of a cell with ramsdellit is two times greater (40 hours versus 20 hours) and at lower discharging rates at a continuous resistance of 300 ohms (FIG. 2) about 50% greater (about 95 hours versus 60 hours) than of a cell with $\gamma$-manganese dioxide.

The following examples serve to illustrate the present invention, without, however, limiting the same thereto.

In the examples below, the symbol A represents Angstrom units, while $a$, $b$, and $c$ represent lattice spaces.

Example 1

The following lattice constants are given for the natural mineral ramsdellit in the literature:

| | A. |
|---|---|
| $a$ | 9.27 |
| $b$ | 2.86 |
| $c$ | 4.53 |

When reacting 2 g. of α-manganese oxide hydrate (synthetic groutit) of the formula MnO(OH), which has been obtained by reducing γ-manganese dioxide, with 100 cc. of a 20% sodium hypobromite solution at about 70° C. for 100–150 hours, manganese dioxide of the composition $MnO_{1.92}$ with the lattice constants.

| | A. |
|---|---|
| $a$ | 9.24 |
| $b$ | 2.86 |
| $c$ | 4.53 | is produced. A comparison with the corresponding lattice constants of ramsdellit as given in the literature shows that the synthetically produced manganese dioxide is the same compound.

Example 2

6 g. of synthetic γ-manganese dioxide are stirred with 100 cc. of 30% nitric acid at 100–120° C. for about 120 hours. The resulting, well crystallized manganese dioxide has the composition $MnO_2$. Its lattice constants correspond to that of ramsdellit and are

| | A. |
|---|---|
| $a$ | 9.26 |
| $b$ | 2.83 |
| $c$ | 4.54 |

When using in Example 1, in place of a 20% sodium hypobromite solution, a 20% potassium hypochlorite solution, a 30% solution of potassium perchlorate, a 10% solution of chromic acid, or a 20% solution of persulfuric acid, a manganese dioxide is obtained which has about the same lattice constants as natural ramsdellit. The temperature during said oxidation reaction may be at room temperature or at elevated temperature up to the boiling point of the solutions, whereby the required conversion time depends upon the temperature at which oxidation is effected.

In place of nitric acid used for recrystallizing γ-manganese dioxide according to Example 2, there may be employed other recrystallizing agents such as at least 5 molar chromic acid, perchloric acid or sulfuric acid. Recrystallization is preferably effected at the boiling point of the acid solution although lower temperatures but not lower than 100° C. may also be used.

Of course, one skilled in the art may make many changes and variations in the oxidizing agents employed when carrying out the process according to the first mentioned process of converting α-manganese oxide hydrate, i.e. synthetic groutit into ramsdellit, in the recrystallizing agent used for recrystallizing γ-manganese dioxide or other manganese dioxides, (the X-ray Debye-Scherrer diagrams of which show only few lines), in the oxidizing and recrystallizing temperatures and duration thereof.

I claim:
1. In a process of producing ramsdellit, the steps which comprise oxidizing manganese oxide hydrate of the formula α-MnO(OH) with an aqueous inorganic oxidizing agent at a concentration not exceeding 30% of the following: perchloric acid and its salts, chromic acid, persulfuric acid, hypochlorites, hypobromites, and hypoiodites, at elevated temperature not exceeding about 70° C. for a period of about 100 to about 150 hours, at an oxidation rate controlled to form ramsdellit, and separating the resulting ramsdellit from the oxidizing agent.

2. The process according to claim 1, wherein the oxidizing agent is an aqueous alkali metal hypobromite.

3. In a process of producing ramsdellit, the steps which comprise contacting γ-manganese dioxide with an aqueous oxidizing acid solution of the following: nitric acid, chromic acid, perchloric acid, and sulfuric acid, at elevated temperature from about 100° C. to the boiling point of the acid solution for a period of time of about 120 hours and sufficient to recrystallize therefrom ramsdellit, and separating the resulting ramsdellit from the acid solution.

4. The process according to claim 3, wherein said acid solution is a nitric acid solution.

References Cited

UNITED STATES PATENTS

| 1,269,914 | 6/1918 | Ellis et al. | 23—145 |
| 2,123,250 | 7/1938 | Muller et al. | 23—145 |
| 2,169,368 | 8/1939 | Murray et al. | 23—145 X |
| 2,667,405 | 1/1954 | Muller et al. | 23—145 |

FOREIGN PATENTS

| 879,387 | 6/1953 | Germany. |
| 1,306,706 | 9/1962 | France. |

OSCAR R. VERTIZ, *Primary Examiner.*

BENNETT H. LEVENSON, *Assistant Examiner.*